(12) United States Patent
Wang et al.

(10) Patent No.: US 12,222,995 B2
(45) Date of Patent: Feb. 11, 2025

(54) WEB PAGE TRANSFORMER FOR STRUCTURE INFORMATION EXTRACTION

(71) Applicant: Google LLC, Mountain View, CA (US)

(72) Inventors: Qifan Wang, Sunnyvale, CA (US); Dongfang Liu, Rochester, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/200,813

(22) Filed: May 23, 2023

(65) Prior Publication Data

US 2023/0297631 A1  Sep. 21, 2023

Related U.S. Application Data

(63) Continuation of application No. PCT/US2021/061567, filed on Dec. 2, 2021.

(51) Int. Cl.
  *G06F 16/951* (2019.01)
  *G06F 16/80* (2019.01)

(52) U.S. Cl.
  CPC ............ *G06F 16/951* (2019.01); *G06F 16/80* (2019.01)

(58) Field of Classification Search
  CPC .............................. G06F 16/951; G06F 16/80
  See application file for complete search history.

(56) References Cited

U.S. PATENT DOCUMENTS

| | | | |
|---|---|---|---|
| 9,535,664 B1* | 1/2017 | Foster | G06F 8/427 |
| 9,684,496 B1* | 6/2017 | Reid | G06F 8/425 |
| 2021/0012102 A1* | 1/2021 | Cristescu | G06F 40/284 |
| 2021/0056263 A1 | 2/2021 | Xia et al. | |
| 2022/0138408 A1* | 5/2022 | Ackermann | G06F 40/186 |
| | | | 715/230 |
| 2022/0198182 A1* | 6/2022 | Semenov | G06F 40/216 |
| 2022/0317979 A1* | 10/2022 | Araujo Soares | G06F 16/9024 |
| 2023/0161952 A1* | 5/2023 | Garimella | G06N 3/08 |
| | | | 715/224 |

OTHER PUBLICATIONS

International Search Report and Written Opinion for Application No. PCT/US21/61567 dated May 13, 2022 (14 pages).

Ernst, Patrick, et al., "KnowLife: a versatile approach for constructing a large knowledge graph for biomedical sciences", BMC Bioinformatics, May 14, 2015, pp. 1-14, vol. 16, No. 1, Biomed Central, London, GB.

* cited by examiner

*Primary Examiner* — Dangelino N Gortayo
(74) *Attorney, Agent, or Firm* — Botos Churchill IP Law LLP

(57) ABSTRACT

The technology provides a rich attention mechanism for structured information extraction of web pages and other electronic documents. An input layer of a model obtains system, information associated with the document, including field tokens representing respective fields to be extracted from the document, structured document type tokens associated, and text tokens from a text sequence in the document. An encoder connects the field tokens, the S type tokens and the text tokens according to a set of different attention patterns. The encoder generates an overall token representation based on the set of different attention patterns. An output layer of the model extracts a final text span for the each of the respective fields from the set of text tokens. The extracted final text span for each of the respective fields is stored in memory, and can be produced in response to a search query, analytics evaluation or other request.

20 Claims, 19 Drawing Sheets

FIG. 2
200

Festival in the Park — 208

Dec 11 — 212

Festival in the Park — 212

Saturdays are for family and friends!

About this event

The Festival in the Park is open to everyone, with plenty of local vendors, rides and attractions!
30 LOCAL VENDORS
Live music all afternoon
Kid-friendly rides
Join us for an awesome day in the park

210

Date and time
Sat, December 11, 2021
12:00 PM – 7:00 PM PDT
Add to calendar

Location
Memorial Park
149 Main Boulevard
San Francisco, CA
View Map

— 214

202

```
<div class="event-listing">
<img content="https://img.dummy.com/image"/>
<p class="list-month">Dec</p><p class="list-day">11</p>
<h1>Festival in the Park</h1>
<div class="x-group">
    <div class="x-cell">
        <h3>Date and time</h3>
        <p class="js-date-first-line">Sat, December 11,
2021 12:00 PM – 7:00 PM PDT </p>
```

204

Title: Festival in the Park

Description:
SAN FRANCISCO
Rad People

Date: Sat, December 11, 2021
Time: 12:00 PM-7:00 PM PDT
Location: Memorial Park
149 Main Boulevard
San Francisco, CA

206

300

400

420

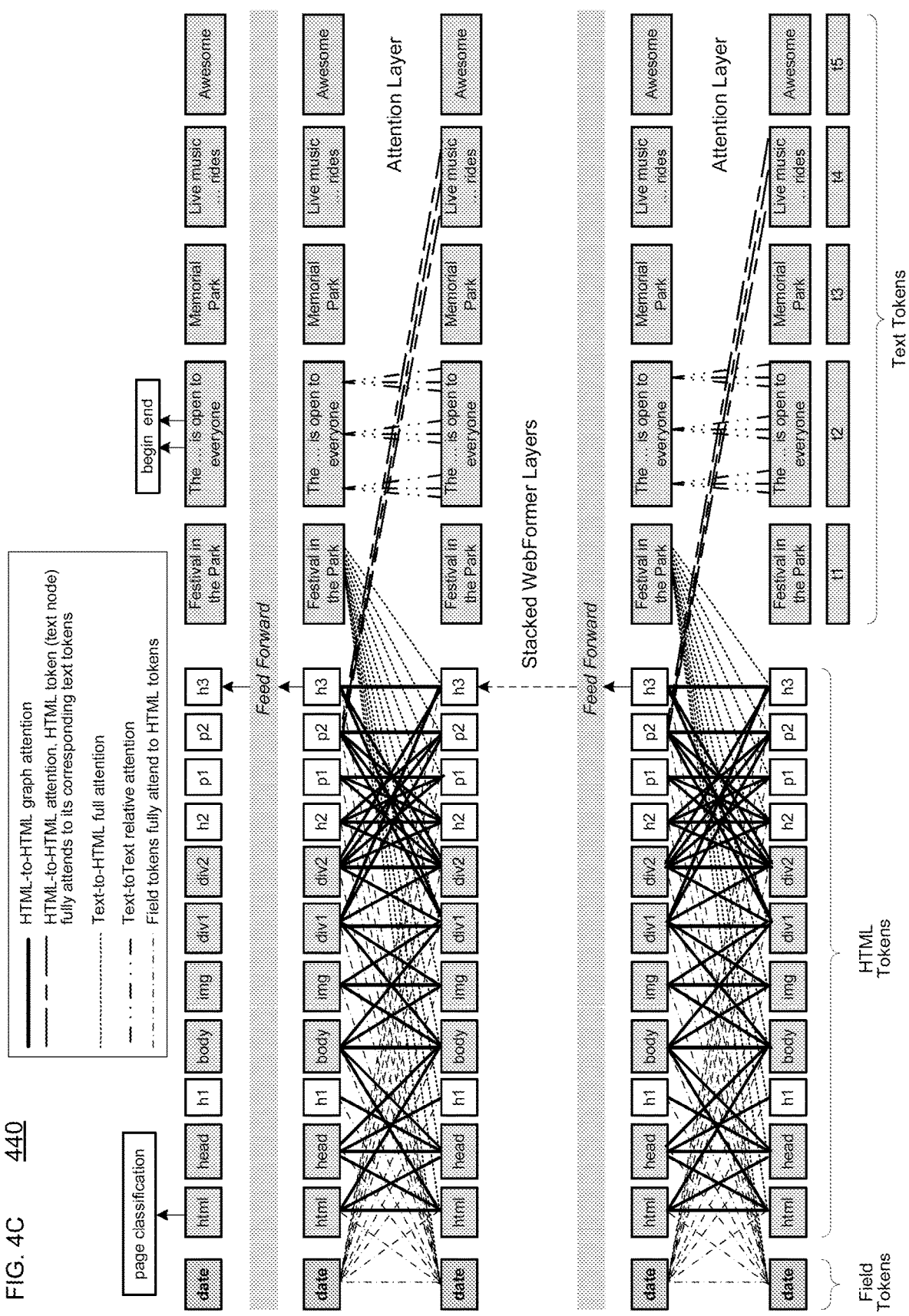

| Data Splits | WebSRC | Common Crawl | | |
|---|---|---|---|---|
| | | Events | Products | Movies |
| Train | 2,572 | 72,367 | 105,642 | 57,238 |
| Dev/Test | 321 | 9,046 | 13,205 | 7,154 |

Table 1: Statistics of the datasets.

| Models | WebSRC | | Events | | Common Crawl Products | | Movies | |
|---|---|---|---|---|---|---|---|---|
| | EM | F1 | EM | F1 | EM | F1 | EM | F1 |
| OpenTag | 67.41 ± 0.27 | 73.30 ± 0.23 | 77.14 ± 0.26 | 83.71 ± 0.12 | 72.57 ± 0.20 | 77.73 ± 0.19 | 80.36 ± 0.15 | 85.06 ± 0.18 |
| DNN | 65.80 ± 0.16 | 72.26 ± 0.22 | 78.43 ± 0.18 | 85.06 ± 0.21 | 74.64 ± 0.27 | 78.56 ± 0.15 | 82.44 ± 0.23 | 86.65 ± 0.16 |
| AVEQA | 71.24 ± 0.35 | 78.48 ± 0.29 | 80.82 ± 0.21 | 86.47 ± 0.14 | 74.85 ± 0.32 | 79.49 ± 0.28 | 83.87 ± 0.30 | 88.51 ± 0.19 |
| H-PLM | 72.11 ± 0.23 | 77.86 ± 0.15 | 82.65 ± 0.13 | 87.52 ± 0.17 | 76.24 ± 0.17 | 81.13 ± 0.26 | 83.72 ± 0.26 | 89.34 ± 0.17 |
| WebFormer | 74.57 ± 0.18 | 82.63 ± 0.31 | 84.79 ± 0.24 | 89.33 ± 0.18 | 80.67 ± 0.20 | 83.37 ± 0.23 | 85.30 ± 0.19 | 90.41 ± 0.24 |

Table 2: Performance comparison on all datasets. Results are statistically significant with p-value < 0.001.

FIG. 6B

| Fields | Events | | Products | | Movies | |
|---|---|---|---|---|---|---|
| | EM | F1 | EM | F1 | EM | F1 |
| Name | 88.27 | 93.46 | 85.11 | 90.53 | 89.32 | 93.57 |
| Description | 81.62 | 85.50 | 77.94 | 81.46 | 82.71 | 88.19 |
| Date | 86.86 | 91.48 | - | - | - | - |
| Location | 82.41 | 86.88 | - | - | - | - |
| Brand | - | - | 84.23 | 85.63 | - | - |
| Price | - | - | 75.65 | 76.86 | - | - |
| Color | - | - | 80.42 | 82.35 | - | - |
| Genre | - | - | - | - | 89.49 | 92.67 |
| Duration | - | - | - | - | 83.74 | 88.35 |
| Director | - | - | - | - | 86.28 | 91.38 |
| Actor | - | - | - | - | 80.16 | 87.44 |
| Publish Date | - | - | - | - | 85.40 | 91.27 |

Table 3: Field level metrics of WebFormer.

FIG. 9

|  | parameters | WebSRC | Common Crawl |
|---|---|---|---|
| AVEQA | 110M | 71.24 | 78.45 |
| H-PLM | 110M | 72.11 | 80.78 |
| WebFormer-2L | 45M | 66.58 | 76.73 |
| WebFormer-6L | 82M | 70.42 | 79.35 |
| WebFormer-12L-share | 109M | 73.12 | 81.49 |
| WebFormer-12L | 151M | 74.57 | 83.22 |
| WebFormer-24L | 285M | 76.60 | 86.51 |

Table 4: EM results over different model configurations

FIG. 11A

| Hyper-parameters | Value |
|---|---|
| DNN | |
| hidden layers | 2 |
| hidden units | 1024 (layer 1), 32 (layer 2) |
| epoch | 10 |
| regularizer | $L_1$ & $L_2$ |
| regularizer weight | 0.001 |
| sparse feature | unigram, bigram, trigram, x_path, htmlTag |
| boolean feature | is_bold, is_italic, is_underline |
| bucketized feature | url_match_rank, x-pos, y-pos, anchor_match_rank, font_ratio |

Table 5: Model hyper-parameters and features for DNN approach.

FIG. 11B

Table 6: Model hyper-parameters details for all sequence modeling approaches.

| Hyper-parameters | Value |
|---|---|
| shared parameters | |
| batch size | 64 |
| training epoch | 10 |
| optimizer | Adam |
| learning rate schedule | linear decay |
| initial learning rate | 3e-5 |
| learning rate warmup steps | 5k |
| vocab size | 30522 |
| OpenTag | |
| max sequence length | 512 |
| word embedding size | 768 |
| unidirectional LSTM units | 512 |
| LSTM inputs dropout | 0.0 |
| LSTM recurrent dropout | 0.4 |
| attention dropout | 0.0 |
| word embedding layer init | BERT |
| AVEQA | |
| max sequence length | 512 |
| transformer layers | 12 |
| transformer attention heads | 12 |
| transformer hidden dimension | 768 |
| pretrained checkpoint | BERT-base |
| H-PLM | |
| max sequence length | 512 |
| transformer layers | 12 |
| transformer attention heads | 12 |
| transformer hidden dimension | 768 |
| pretrained checkpoint | ELECTRA-base |
| WebFormer | |
| max text sequence length | 2048 |
| max HTML tokens | 256 |
| attention layers | 12 |
| attention heads | 12 |
| hidden dimension | 768 |
| local attention radius | 64 |
| FFN hidden units | 3072 |
| attention dropout | 0.1 |
| word embedding layer init | BERT |

| batch size | 64 | | | 128 | | | 512 | | |
|---|---|---|---|---|---|---|---|---|---|
| learning rate | $3\times10^{-5}$ | $5\times10^{-5}$ | $1\times10^{-4}$ | $3\times10^{-5}$ | $5\times10^{-5}$ | $1\times10^{-4}$ | $3\times10^{-5}$ | $5\times10^{-5}$ | $1\times10^{-4}$ |
| WebSRC | 74.57 | 74.32 | 74.58 | 74.34 | 74.45 | 74.37 | 74.14 | 74.09 | 74.21 |
| Events | 84.79 | 84.62 | NaN | 84.54 | 84.46 | 84.65 | 84.11 | 84.27 | 84.13 |
| Products | 80.67 | 80.71 | NaN | 80.32 | 80.38 | 80.40 | 79.96 | 80.23 | 80.37 |
| Movies | 85.30 | 85.21 | 85.14 | 84.58 | 84.75 | 84.83 | 84.39 | 84.56 | 84.77 |

Table 7: EM results of WebFormer with different batch sizes and learning rates on all datasets.

FIG. 12

WEB PAGE TRANSFORMER FOR STRUCTURE INFORMATION EXTRACTION

CROSS-REFERENCE TO RELATED APPLICATIONS

The present application is a continuation of International Application No. PCT/US21/61567, filed Dec. 2, 2021, the entire disclosure of which is hereby incorporated by reference.

BACKGROUND

Since the advent of the Internet, a vast number of websites have been created that contain rich information about various topics of interest. There are different ways to extract information from websites and present that information so that users can effectively and efficiently find what they are looking for. In particular, the field of structure information extraction involves extracting structured fields of an object from web pages, such as extracting a product offer from a shopping page including product title, description, brand and price. This can be a challenging task due to the unstructured nature of textual data and the diverse layout patterns of web documents. Techniques such as template/wrapper induction have had some success, but do not scale to the whole web where obtaining accurate ground truth for a large amount of domains can be resource intensive. Moreover, wrappers can go out of date quickly because the page structure changes, and new templates are needed for the new domains. Natural language models have also been applied to web document information extraction. There can be several major limitations that can impact this, including lack of exploitation of the structural HTML layout, inability to scale models to a large number of fields across domains, and the quadratic computational cost associated with sequence length.

BRIEF SUMMARY

The present technology relates to systems and methods for efficiently extracting machine-actionable structured data from web documents. In particular, the technology involves a web page transformer model for structure information extraction from web documents. This can include designing tokens for each Document Object Model ("DOM") node in the Hypertext Markup Language ("HTML") or other structured document, by embedding representations from neighboring tokens through graph attention. Rich attention patterns are constructed between such HTML tokens and text tokens, which leverages the web layout for more effective attention weight compensation. This approach therefore explicitly recovers both local syntactic and global layout information that may have been lost during serialization.

The technology effectively integrates the web HTML layout via graph attention into the sequence modeling. By providing a rich attention mechanism for embedding representation among different types of tokens, the technology enables the model to encode long sequences efficiently. It also empowers the model for zero-shot extractions on new domains. The technology can be significantly less computationally expensive than other information extraction systems and methods. In addition, unlike other methods that may require specific extraction solutions to be built for each domain, the present technology provides an enhanced technical benefit by generating models that can scale up to a large number of fields across domains and that can be generalized to new domains.

According to one aspect of the technology, a method for structured information extraction from electronic documents is provided. The method comprises obtaining, at an input layer of a model implemented by one or more processors of a computing system, information associated with a structured electronic document, the information including (i) one or more field tokens each representing a respective field to be extracted from the structured electronic document, (ii) a set of structured document type ("S type") tokens associated with a document object model ("DOM") of the structured electronic document, and (iii) a set of text tokens from a text sequence in the structured electronic document; connecting, by an encoder of the model implemented by the one or more processors of the computing system, the one or more field tokens, the set of S type tokens and the set of text tokens according to a set of different attention patterns, the set of different attention patterns including (i) an S type-to-S type attention that models relations among the S type tokens via graph attention, (ii) an S type-to-text attention that bridges each respective S type token in the set with a corresponding text token from the set of text tokens, (iii) text-to-S type attention that propagates information from the set of S type tokens to the set of text tokens, and (iv) text-to-text attention; generating, by the encoder, an overall token representation based on the set of different attention patterns; extracting, by an output layer of the model implemented by the one or more processors of the computing system, a final text span for the each of the respective fields from the set of text tokens; and storing the extracted final text span for each of the respective fields in memory associated with the computing system, the extracted final text span for each of the respective fields being configured for production in response to a request.

The structured electronic document may have a Hypertext Markup Language ("HTML") layout, and the set of S type tokens is a set of HTML tokens. In this case, the S type-to-S type attention may be HTML-to-HTML attention in which the set of HTML tokens are connected via a DOM tree graph.

The extracted final text span for each of the respective fields may be stored in memory as a contextual representation of the structured electronic document. Alternatively or additionally, the overall token representation may include output embeddings for the one or more field tokens, the set of S type tokens, and the set of text tokens. Here, the final text span for each of the respective fields may be computed based on an encoded field-dependent text embedding for that respective field.

The method of any variation of the above may further comprise converting, at the input layer, each token of the one or more field tokens, the set of S type tokens, and the set of text tokens into a corresponding d-dimensional embedding vector. The S type tokens may be formulated by concatenating a tag embedding and a segment embedding, in which the segment embedding indicates which type a given token belongs. Alternatively or additionally, embeddings according to the converting may be trainable based on one or more hyperparameters selected during training of the model. The one or more hyperparameters may include at least one of batch size, training epoch, optimizer type, learning rate schedule, initial learning rate, learning rate warmup step amount or vocabulary size.

In the method of any variation of the above, the encoder may comprise a set of contextual layers that connect the one or more field tokens, the set of S type tokens, and the set of text tokens with the set of different attention patterns, followed by a feed-forward network. The set of contextual layers may be identical.

In the method of any variation of the above, the structured electronic document may comprise a plurality of fields and the one or more field tokens is a set of field tokens having each token correspond to one of the plurality of fields, and field information for each field token may be jointly encoded so that the plurality of fields shares a unique encoder.

According to another aspect of the technology, a processing system is configured for structured information extraction from electronic documents. The processing system comprises memory configured to store data associated with the structured information extraction, and one or more processors operatively coupled to the memory. The one or more processors are configured to: obtain, at an input layer of a model, information associated with a structured electronic document, the information including (i) one or more field tokens each representing a respective field to be extracted from the structured electronic document, (ii) a set of structured document type ("S type") tokens associated with a document object model ("DOM") of the structured electronic document, and (iii) a set of text tokens from a text sequence in the structured electronic document; connect, by an encoder of the model, the one or more field tokens, the set of S type tokens and the set of text tokens according to a set of different attention patterns, the set of different attention patterns including (i) an S type-to-S type attention that models relations among the S type tokens via graph attention, (ii) an S type-to-text attention that bridges each respective S type token in the set with a corresponding text token from the set of text tokens, (iii) text-to-S type attention that propagates information from the set of S type tokens to the set of text tokens, and (iv) text-to-text attention; generate, by the encoder, an overall token representation based on the set of different attention patterns; extract, by an output layer of the model, a final text span for the each of the respective fields from the set of text tokens; and store, in the memory, the extracted final text span for each of the respective fields in memory associated with the computing system, the extracted final text span for each of the respective fields being configured for production in response to a request.

The extracted final text span for each of the respective fields may be stored in the memory as a contextual representation of the structured electronic document. Alternatively or additionally, the one or more processors are further configured to convert, at the input layer, each token of the one or more field tokens, the set of S type tokens, and the set of text tokens into a corresponding d-dimensional embedding vector. Here, the S type tokens may be formulated by concatenation of a tag embedding and a segment embedding, in which the segment embedding indicates which type a given token belongs. Alternatively or additionally, embeddings according to the conversion may be trainable based on one or more hyperparameters selected during training of the model. Here, the one or more hyperparameters may include at least one of batch size, training epoch, optimizer type, learning rate schedule, initial learning rate, learning rate warmup step amount or vocabulary size. In any variation of the above processing system, the encoder may be implemented as a set of contextual layers that connect the one or more field tokens, the set of S type tokens, and the set of text tokens with the set of different attention patterns, followed by a feed-forward network.

BRIEF DESCRIPTION OF THE DRAWINGS

FIG. 2 illustrates an example webpage, associated HTML, and extracted structured information in accordance with aspects of the disclosure.

FIGS. 4A-C illustrate a model architecture and related features in accordance with aspects of the technology.

FIG. 5 illustrates Table 1 regarding aspects of the technology.

FIGS. 6A-B illustrate Tables 2 and 3 regarding aspects of the technology.

FIG. 9 illustrates Table 4 regarding aspects of the technology.

FIGS. 11A-B illustrate Tables 5 and 6 regarding aspects of the technology.

FIG. 12 illustrates Table 7 regarding aspects of the technology.

DETAILED DESCRIPTION

Figure 1:
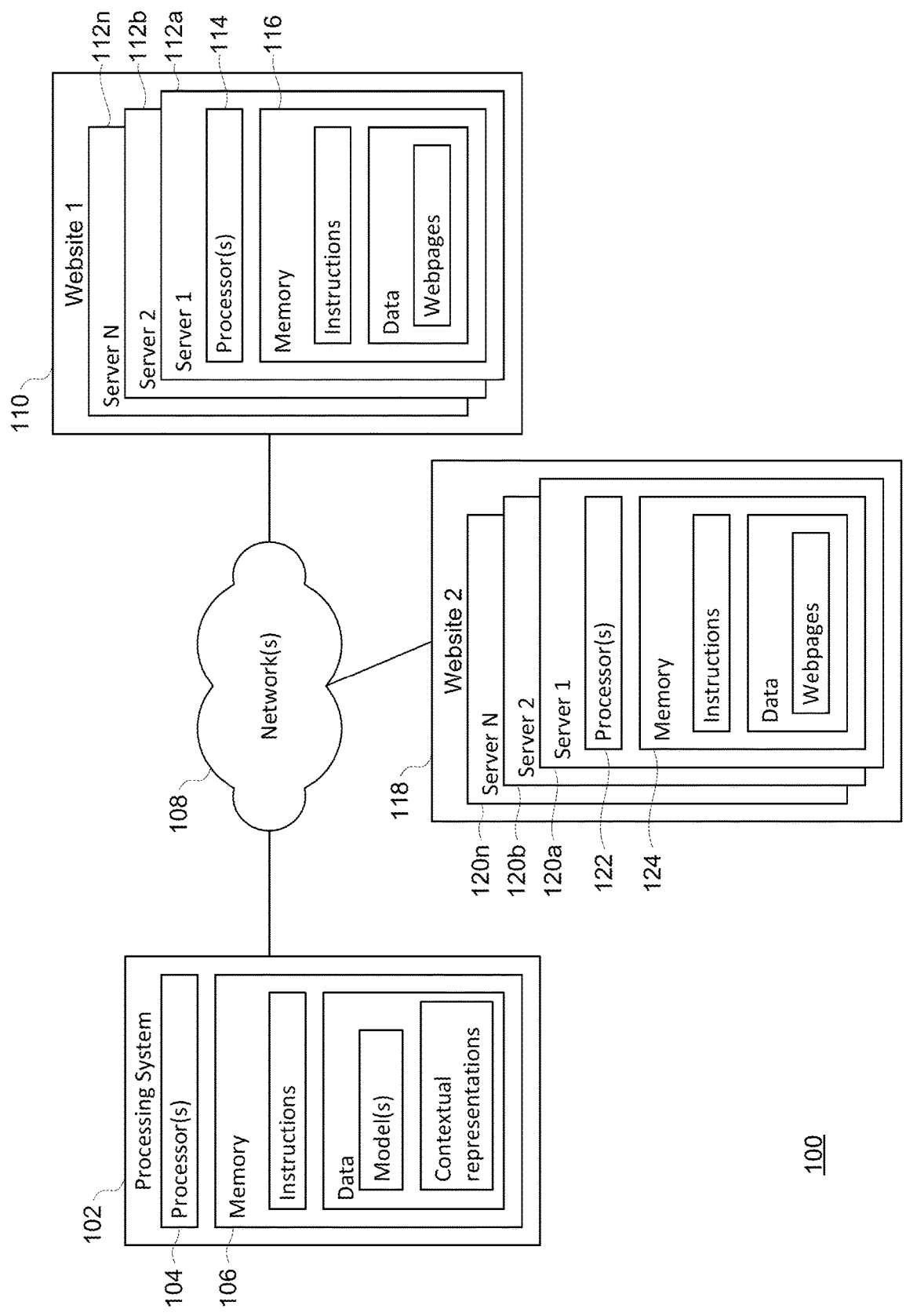
FIG. 1 is a functional diagram of an example system in accordance with aspects of the disclosure.

The present technology will now be described with respect to the following exemplary systems and methods.
Example Systems FIG. 1 schematically illustrates an arrangement 100 with an exemplary processing system 102 for performing the methods described herein. The processing system 102 includes one or more processors 104 and memory 106 storing instructions and data. In addition, the one or more processors 104 may include the various modules described herein, and the instructions and data may include the models described herein. Other data, such as contextual representations of web documents generated according to the models and/or data for training the model, may be stored with or separately from the model information.

The processing system 102 is shown being in communication with various websites, including websites 110 and 118, over one or more networks 108. Exemplary websites 110 and 118 each include or are otherwise associated with one or more servers 112a-112n and 120a-n, respectively. Each of the servers 112a-112n and 120a-n may have one or more processors (e.g., 114 and 122), and associated memory (e.g., 116 and 124) storing instructions and data, including the HTML (or other document structure) of one or more webpages. However, various other topologies are also possible. For example, the processing system 102 may not be in direct communication with the websites, and may instead process stored versions of the HTML of the websites to be processed.

Processing system 102 may be implemented on different types of computing device(s), such as any type of general computing device, server, or set thereof, and may further include other components typically present in general purpose computing devices or servers. The memory 106 stores information accessible by the one or more processors 104, including instructions and data that may be executed or otherwise used by the processor(s) 104. The memory may be of any non-transitory type capable of storing information accessible by the processor(s) 104. For instance, the memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen, touchless gesture recognition and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Web Page Configurations

In addition to the systems described above and illustrated in the figures, various operations will now be described. In that regard, there are multiple ways that processing system 102 could be configured to perform structure data extraction from websites.

FIG. 2 illustrates an example 200 of an event web page 202 with its HTML 204 and the extracted structured event information 206, which includes event title, description, date and time, and location. The corresponding text of each field on the web page are shown in respective bounding boxes 208, 210, 212 and 214. The event web page 202 is associated with a particular website, e.g., Website 1 or Website 2 of FIG. 1. The processing system 102 of FIG. 1 is configured to obtain the details of the event web page 202, such as by visiting the particular website and scraping details about the web page.

Figure 3:
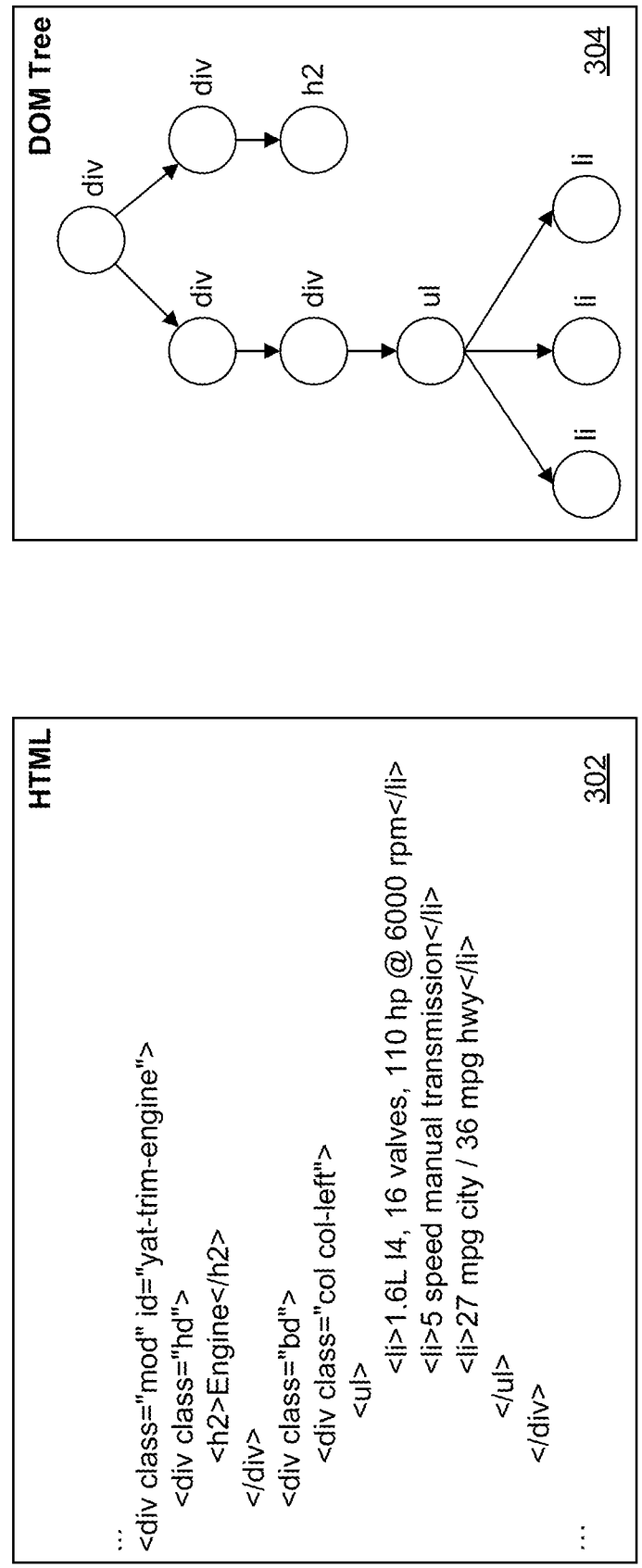
FIG. 3 is a diagram showing how a section of HTML may be represented as a DOM Tree.

FIG. 3 illustrates an example 300 showing a portion of HTML 302 for a web page along with a Document Object Model ("DOM") tree 304 associated with the HTML 302. A DOM tree 304 is a tree structure representing a document, where the nodes are objects representing a part of the document. In this example, the web page may be for an automobile-related website. In that regard, on the exemplary automobile website, the page for each vehicle may have a table with a row that states "model" and then lists the model name, a row that states "engine" and then lists the engine size, a row that states "gas mileage" and then lists the gas mileage, etc. For the DOM tree structure, each branch ends in a node, and each node may include an XML Path ("XPath") and its associated HTML content. While the nodes of the DOM tree 304 are shown in FIG. 3 as empty circles, in actuality they would include the HTML content associated with each node.

Example Methods

Figure 4A:
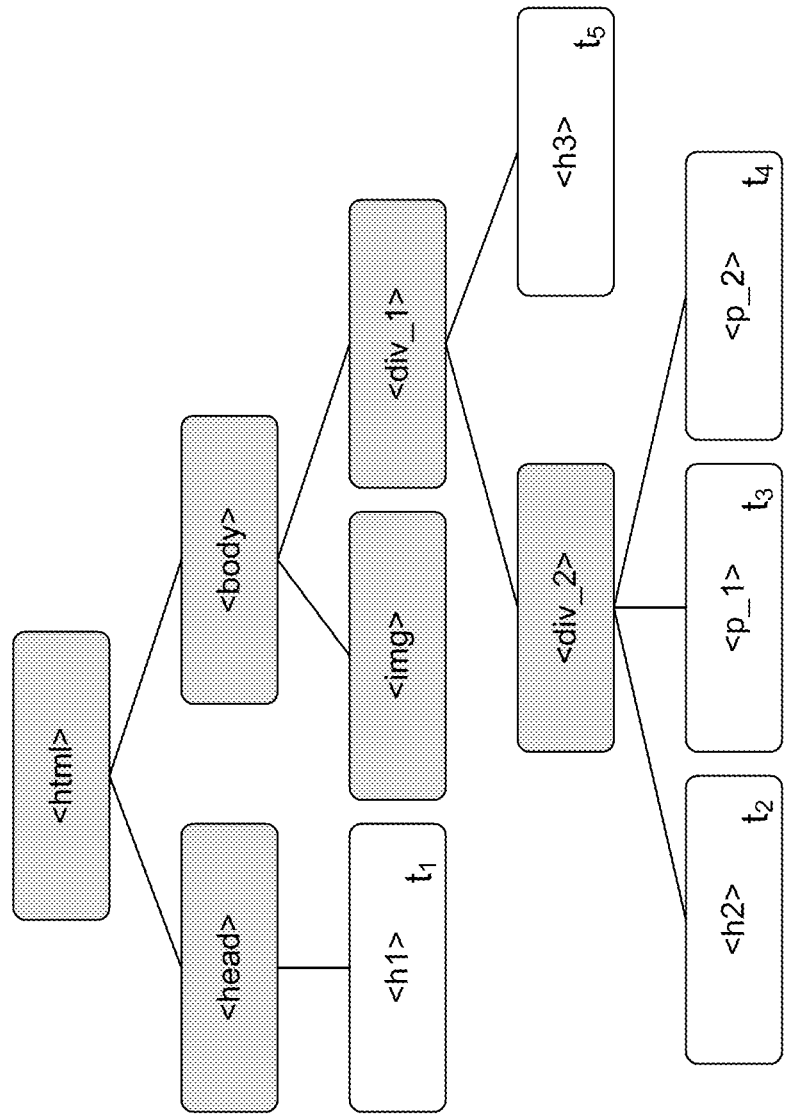

The problem of structured information extraction from web documents can be understood in view of the following. Denote a text sequence (e.g., "Festival in the Park" per block 208 of FIG. 2) from the web document as $T=(t_1; t_2, \ldots, t_k)$, where $t_i$ represents the i-th text node on the web and k is the total number of text nodes with $t_i=(w_{i1}, w_{i2}, \ldots, w_{in_i})$ as its $n_i$ words/tokens. Denote the DOM tree of the HTML as $G=(V, E)$, where V is the set of DOM nodes in the tree with E being the set of edges. Note that the k text nodes are essentially connected in this DOM representation of the HTML, representing the layout of the web document (e.g., absolute and/or relative spatial locations of objects, sizes of objects etc.). The goal of structured information extraction is that given a set of fields $F=(f_1, \ldots, f_m)$, extract their corresponding text information from the web document. Formally, the problem is defined as finding the best text span $\bar{s}_j$ for each field $f_j$ given the web document T and G:

$$\bar{s}_j = \underset{b_j, e_j}{\mathrm{argmax}} Pr(w_{b_j}, w_{e_j} \mid f_j, T, G)$$

where $b_j$ and $e_j$ are the begin and end offsets, respectively of the extracted text span in the web document for field $f_j$. FIG. 4A illustrates an example DOM tree 420 in which there are 5 text nodes (<h1>, <h2>, <h3>, <p_1>, and <p_2>) and a number of internal (non-text) nodes (<html>, <head>, <body>, <img>, <div_1>, and <div_2>).

Note that while HTML is a primary example here, the model architecture discussed herein can be employed with other structured or semi-structured formats ("structured documents"), e.g., other markup languages that use tags to define elements with a document (such as XML, XHTML or SGML).

Figure 4B:
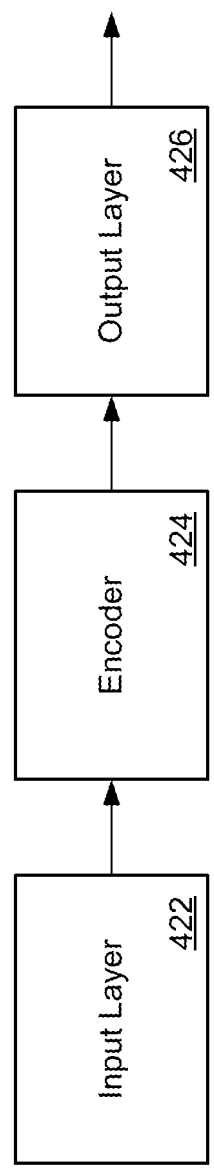

An example 420 of the overall model architecture is shown in FIG. 4B. In accordance with aspects of the technology, the model architecture comprises three main components: an input layer 422, an encoder 424 and an output layer 426. The input layer 422 contains the construction of the input tokens as well as their embeddings, including the field token, the set of HTML (structured) tokens from DOM tree G and the set of text tokens from the text sequence T. The encoder 424 is the module that encodes the input sequence with rich attention patterns, including HTML-to-HTML (H2H), HTML-to-Text (H2T), Text-to-HTML (T2H) and Text-to-Text (T2T) attentions. In the output layer 426, the text span corresponding to the field is computed based on the encoded field-dependent text embeddings. The output of 424 is the set of contextual representations of the HTML and text tokens. The output of the output layer 426 is the probability of the begin/end token index, which produces the final text span extraction (with the highest probability). FIG. 4C illustrates a view 440 showing field tokens, HTML tokens and text tokens. In particular, the HTML tokens in FIG. 4C represent the DOM tree of FIG. 4A. The graph attention within the HTML tokens (H2H attention) represents the connections of the DOM nodes. The text to HTML (T2H) and HTML to text (H2T) attentions bridge the HTML tokens with the text tokens. And the text to text (T2T) local attention learns the contextual embeddings of the text tokens. To generalize this example, for any structured document type (e.g., HTML, XML, XHTML or SGML), referenced here as an "S" type, the encoder 424 is the module that encodes the input sequence with rich attention patterns, including S Type-to-S Type (S2S), S Type-to-Text (S2T), Text-to-S Type (T2S) and Text-to-Text (T2T) attentions.

Regarding the input layer 422, according to one aspect of the technology the text sequence is jointly modeled with the HTML (or other S type) layout in a unified Transformer model. In particular, three types of tokens are introduced in the input layer 422: a field token, an HTML (or other S type) token and a text token. A field token is used to represent the field to be extracted, such as "title", "company" and "salary" for a job page, or "date" and "location" for an event page. Each node in the DOM tree G (see, e.g., FIG. 4A), including both internal nodes (non-text node) and text nodes, corresponds to an HTML token in the system. The embedding of a HTML token can be viewed as a summarization of the sub-tree rooted by this node. For example, in as shown between FIGS. 4A and 4C, the embedding of the "<html>" token essentially represents the full web document, which can be used for page/document level classification. On the other hand, the embedding of the text node "<p2>" summarizes the text sequence $t_4$.

The text token is the commonly used word representation in natural language models. In the present example, $t_1$ contains three words, "Fun", "Family" and "Fest", which correspond to three text tokens. In the input layer, every token is converted into a d-dimensional embedding vector. Specifically, for field and text tokens, their final embeddings are achieved by concatenating a word embedding and a segment embedding. For HTML token embedding, they are formulated by concatenating a tag embedding and a segment embedding. Segment embedding is added to indicate which type the token belongs to, e.g., field, HTML or text. The tag embedding is introduced to represent different HTML-tag of the DOM nodes, e.g., "div", "head", "h1", "p", etc. Note that all the embeddings in this approach are trainable. The word embeddings can be initialized from the pretrained language model, while the segment and tag embeddings can be randomly initialized. There are different hyperparameters that can be set during training, examples of which are presented in Table 6 of FIG. 11B. In short, the number of layers, training batch size, learning rate, etc. could all affect the model quality.

The encoder 424 may comprise a stack of L identical contextual layers, which efficiently connects the field,
HTML and text tokens with rich attention patterns followed by a feed-forward network. The encoder produces effective contextual representations of web documents. To capture the complex HTML layout with the text sequence, four different attention patterns may be utilized. These attention patterns include (1) an HTML-to-HTML (H2H) attention (or other S2S attention) which models the relations among HTML (or other structured document) tokens via graph attentions; (2) HTML-to-Text (H2T) attention (or other S2T attention), which bridges the HTML (or other structured document) token with its corresponding text tokens; (3) Text-to-HTML (T2H) attention (or other T2S attention) that propagates the information from the HTML (or other structured document) tokens to the text tokens; and (4) Text-to-Text (T2T) attention with relative position representations. Moreover, the architecture may incorporate the field into the encoding layers to extract the text span for the field.

Thus, as indicated above, for non-HTML situations, e.g., XML or another (semi) structured format, the attention patterns would include (1) an S-to-S attention (S2S) which models the relations among the XML or other tokens via graph attentions; (2) S-to-Text (S2T) attention, which bridges the XML or other token with its corresponding text tokens; (3) Text-to-S (T2S) attention that propagates the information from the XML or other tokens to the text tokens; as well as the T2T tokens.

For HTML-to-HTML (H2H) attention, the HTML tokens are naturally connected via the DOM tree graph. The H2H attention essentially computes the attention weights among the HTML tokens and transfers the knowledge from one node to another with the graph attention. The original graph G that represents the DOM tree structure of the HTML may be used in the H2H attention calculation. In addition, edges are added to connect the sibling nodes in the graph, which is equivalent to include certain neighbors with edge distance 2 in the graph. For example, the HTML token "<div1>" is connected with itself, the parent token "<body>", the child tokens "<div2>" and "<h3>", and sibling token "<img>". Formally, given the HTML token embedding $x_i^H$, the H2H graph attention is defined as:

$$\alpha_{ij}^{H2H} = \frac{\exp(e_{ij}^{H2H})}{\sum_{\ell \in N(x_i^H)} \exp(e_{i\ell}^{H2H})}, \text{ for } j \in N(x_i^H)$$

$$e_{ij}^{H2H} = \frac{x_i^H W_Q^{H2H} (x_j^H W_K^{H2H} + a_{ij}^{H2H})^T}{\sqrt{d}}$$

where $N(x_i^H)$ indicates the neighbors of the HTML token $x_i^H$ in the graph. $W_Q^{H2H}$ and $W_K^{H2H}$ are learnable weight matrices, and $\alpha_{ij}^{H2H}$ are learnable vectors representing the edge type between the two nodes, e.g., parent, child or sibling.

The HTML-to-Text (H2T) attention may only be computed for the text nodes in the HTML to update their contextual embeddings. Here, a full attention pattern is adopted where the HTML token $x_i^H$ is able to attend to each of its text tokens $x_j^T$ in $t_i$. For example, in FIG. 4C, the HTML token "<p2>" attends to all the three text tokens in $t_4$: "Spark", "Social" and "SF". The H2T full attention is defined as:

$$\alpha_{ij}^{H2T} = \frac{\exp(e_{ij}^{H2T})}{\sum_{\ell \in t_i} \exp(e_{i\ell}^{H2T})}, \text{ for } j \in t_i$$

-continued
$$e_{ij}^{H2T} = \frac{x_i^H W_Q^{H2T} (x_j^T W_K^{H2T})^T}{\sqrt{d}}$$

where $W_Q^{H2T}$ and $W_K^{H2T}$ are weight matrices in H2T attention.

For Text-to-HTML (T2H) attention, each text token communicates with every HTML token. This T2H attention allows the text token to absorb the high-level representation from these summarization tokens of the web document. The formulation of the T2H attention is analogous to the above H2T attention except that each text token attends to all HTML tokens.

Text-to-Text Attention

Text-to-Text (T2T) attention learns contextual token embeddings for the text sequence. The computational cost of the traditional full attention grows quadratically with the sequence length, and thus limits the size of the text tokens. In one aspect, T2T attention adopts relative attention pattern with relative position encodings, where each text token only attends to the text tokens within the same text sequence and within a local radius r. In FIG. 4C, the local radius r is set to 1, which means each token will only attend to its left and right tokens, and itself. For instance, the text token "is" in $t_2$ attends to the tokens "This", "is" and "a" within $t_2$. The formal T2T relative attention is defined as:

$$\alpha_{ij}^{T2T} = \frac{\exp(e_{ij}^{T2T})}{\sum_{i-r \leq l \leq i+r} \exp(e_{il}^{T2T})}, \text{ for } i-r \leq j \leq i+r$$

$$e_{ij}^{T2T} = \frac{x_i^T W_Q^{T2T} (x_j^T W_K^{T2T} + b_{i-j}^{T2T})^T}{\sqrt{d}}$$

where $W_Q^{T2T}$ and $W_K^{T2T}$ are weight matrices in T2T attention. $b_{i-j}^{T2T}$ are learnable relative position encodings representing the relative position between the two text tokens. Note that there are total 2r+1 possible relative position encoding, in which $(i-j) \in \{-r, \ldots, -1, 0, 1, \ldots, r\}$.

For Field Token attention, the model jointly encodes the field information such that the structured fields share the unique encoder. The field tokens enable full cross-attentions between field and HTML tokens. Note that one can easily add cross-attention between field and text tokens, although this may not improve the extraction quality. Although there is no direct interaction between field and text tokens, they are bridged together through the text-to-HTML and the HTML-field attentions.

The final (overall) token representation is computed based on the above rich attention patterns among field, text and HTML tokens. The output embeddings for field, text and HTML tokens $z_i^F$, $z_i^T$, $z_i^H$, are calculated as follows:

$$z_i^F = \sum_j \alpha_{ij}^{F2H} x_j^H W_V^F$$

$$z_i^T = \sum_{i-r \leq j \leq i+r} \alpha_{ij}^{T2T} x_j^T W_V^T + \sum_k \alpha_{ij}^{T2H} x_k^H W_V^H$$

$$z_i^H = \sum_{j \in N(x_i^H)} \alpha_{ij}^{H2H} x_j^H W_V^H + \sum_{k \in t_i} \alpha_{ij}^{H2T} x_k^T W_V^T$$

where all the attention weights $\alpha_{ij}$ are describe above. $W_V^F$, $W_V^T$, and $W_V^H$ are the learnable matrices to compute the values for field (F), text (T) and HTML (H) tokens, respectively.

The output layer 426 extracts the final text span for the field from the text tokens. A softmax function is applied on the output embeddings of the encoder to generate the probabilities for the begin and end indices:

$$P_b = \text{softmax}(W_b Z^T)$$

$$P_e = \text{softmax}(W_e Z^T)$$

where $Z^T$ is the contextual embedding vectors of the input text sequence. $W_b$ and We are two parameter matrices that project the embeddings to the output logits, for the begin and end respectively. In addition, the system may further predict the end index based on the start index by concatenating the begin token embedding with every token embedding after it. The information obtained by the output layer 426 may then be stored in memory, e.g., as contextual representations, such as in memory 106 of FIG. 1. Such information may then be provided to a user or an app or other program, for instance in response to a search query, analytics evaluation (e.g., of one or more websites or types of information) or other request.

If one were to treat HTML tags as additional text tokens, and combine with the text into a single sequence without the H2H, H2T and T2H attentions, the model would degenerate to a sequence modeling approach that serialize the HTML layout. If one were to further trim the HTML from the sequence, the model would regress to a sequence model that only uses the text information. Moreover, if one were to also remove the field from the input, the model would degenerate to a sequence tagging approach that is not able to scale to a large set of fields.

Testing and Experimentation

A variety of experiments were conducted with the model and aspects described herein. The WebSRC dataset was utilized in some experiments, as it was designed for structural reading comprehension and information extraction on the web. It contains 6.5K web pages with their HTML sources from 10 domains, e.g., "Jobs", "Books", "Autos", etc. The KV-type pages were utilized in testing, resulting in a subset of 3,214 pages with 71 unique fields. These pages are all single object pages containing multiple key-value pairs, e.g. ("genre", "Science Fiction"). The keys are used as the fields, while the values are the answers to be extracted from the web page.

The WebSRC dataset contains three types of web pages: KV (key-value), Comparison and Table. The experiments discussed herein focused on the KV type paged. The reason is that both Comparison and Table web pages are more suitable for multi-object extraction, where those objects information are described in a table or list and can be obtained directly with repeated pattern or table extraction techniques. For the KV pages, the key-value pairs only contain value text without any span information in the text sequence of the web page. Therefore, the span of the value in the text sequence needs to be labeled, since the model utilizes token level spans for extraction during training.

The Common Crawl corpus is designed to support research on information retrieval and related tasks. Common Crawl contains more than 250 TiB of content from more than 3 billion web pages. In certain experiments, web pages were selected that have schema.org annotations within the three domains: Events, Products and Movies. The schema.org annotations contain the website provided markup information about the object, which are used as ground-truth labels. The fields are {"Name", "Description", "Date", "Location"}, {"Name", "Description", "Brand", "Price", "Color"} and {"Name", "Description", "Genre", "Duration", "Director", "Actor", "Published Date"} for event, product and movie pages respectively. These pages were further filtered by restricting to English and single object pages. The web pages can be downsampled by allowing at most 2K pages per website to balance the data, as some websites might dominate the results. Note that multi-object pages have different page structure and could be extracted with methods like repeated patterns. All datasets may then be randomly split into train, dev and test sets with ratio 8:1:1. The details are given in Table 1 presented in FIG. 5.

The Common Crawl dataset contains a huge amount of web pages with schema.org annotations, which are used as the supervision in various information extraction tasks. An example Event annotation may contain the annotation type "https://dummy.org/Event", as well as the annotations for all the event fields including name, description, date and location. In experiments, a focus was on three big domains: Events, Products and Movies. Single object pages were selected, which only have one single schema.org type annotation. The span was labeled corresponding to the field in the text sequence.

The process of labeling spans is as follows. Use white-space to tokenize the text on the web into unigrams. For example, 'This is a very long paragraph about HelloKitty' is tokenized to ['This', 'is', 'a', 'very', 'long', 'paragraph', 'about', 'HelloKitty']. In this step, all punctuation is removed. Also use white-space to tokenize the answer into unigrams. For example, 'very long' is tokenized to ['very', 'long']. Search and match the answer unigrams in the text unigrams. And map the unigram span of the answer to character bytes span. During testing, there were 3.87% examples in the Common Crawl dataset whose answer text could not be matched by this procedure. Those examples were excluded in the experiments. Moreover, it was found there were roughly 21.54% examples where the answer had multiple occurrences in the text. In the experiments, the first answer occurrence was picked as the answer span, although a more robust way is to adopt the BIO-based span extraction for multiple answer spans.

In certain testing, the models were implemented using TensorFow, which is an open-source machine learning platform, and Keras, which is a deep learning API employed with TensorFlow. By way of example, each model was trained on a 32 core TPU v3 configuration. The word embedding may be initialized with a pretrained BERT-base. According to one aspect, parameters used in in the models may comprise 12 layers, 768 hidden size, 3072 hidden units (for a feedforward neural network or FFN) and 64 local radius. By way of example, the maximum text sequence length may be set to 2048. The maximum number of HTML tokens may be set to 256. During training, the gradient descent algorithm with the Adam optimizer algorithm can be employed. The initial learning rate may be set to 3e-5. The batch size for each update may be set as 64 and the model can be trained for up to 10 epochs. In such examples, the dropout probability for the attention layer can be set to 0.1 or more or less.

The evaluation of the model can be done using two standard evaluation metrics, Exact Match (EM) and F1. A comparison against other models in various situations shows technical benefits of the model provided herein. In the comparisons performed during testing, the baseline models were OpenTag, DNN, AVEQA and H-PLM. OpenTag uses a BiLSTM-Attention-CRF architecture with sequence tagging strategies. OpenTag does not encode the field and thus builds one model per field. Details about OpenTag may be found in the 2018 article from Zheng et al., "OpenTag: Open Attribute Value Extraction from Product Profiles", in SIGKDD, pp. 1049-1058. DNN applies deep neural networks for information extraction. Text nodes in the HTML are treated as candidates, and are extracted with DNN classifiers. Details about DNN may be found in the 2019 article from Wang et al., "Constructing a Comprehensive Events Database from the Web", in CIKM pp. 229-238. AVEQA formulates the problem as an attribute value extraction task, where each field is treated as an attribute. This model jointly encodes both the attribute and the document with a BERT encoder. Details about AVEQA may be found in the 2020 article from Wang et al., "Learning to Extract Attribute Value from Product via Question Answering: A Multi-task Approach", in SIGKDD pp. 47-55. Details about BERT may be found in the 2019 article from Devlin et al., "BERT: Pre-training of Deep Bidirectional Transformers for Language Understading", in NAACL-HLT pp. 4171-4186. H-PLM sequentializes the HTML together with the text and builds a sequence model using the pre-training ELECTRA as backbone. Details about H-PLM may be found in the 2021 article from Chen et al., "WebSRC: A Dataset for Web-Based Structural Reading Comprehension", in EMNLP". Details about ELECTRA may be found in the 2020 article from Clark et al., "Pre-training Text Encoders as Discriminators Rather Than Generators", in ICLR. The codes for OpenTag4 and H-PLM5 are publicly available. For DNN and AVEQA, information was obtained from the authors of those techniques. Each of the references mentioned in this paragraph are hereby incorporated by reference in their entirety.

The evaluation results of the model provided herein and all baselines are reported in Table 2, which is shown in FIG. 6A. From these comparison results, it can be seen that the model provided herein (referred to as "WebFormer") achieves the best performance among all compared methods on all datasets. For example, the EM metric of WebFormer increases over 7.8% and 5.8% compared with AVEQA and H-PLM on Products. There are three main reasons. First, the present model integrates the HTML layout into a unified HTML-text encoder with rich attention, which enables the model to effectively understand the web layout structure. Second, WebFormer adopts the relative position encoding in T2T attention, which allows our model to represent large documents efficiently. Third, the field information is jointly encoded and attended with both HTML and text tokens. Different fields share one encoder and thus are able to benefit from each other.

The field level results of WebFormer are also presented on the Common Crawl dataset in Table 3 of FIG. 6B. It can be seen in Table 3 that some fields, such as "Name" and "Genre", obtain relatively higher scores compared with "Price" and "Location". It can also be seen that the difference between EM and F1 scores is very small for fields like "Brand" and "Color". The reason is that their text spans are usually very short, containing just one or two tokens.

Figure 7A:
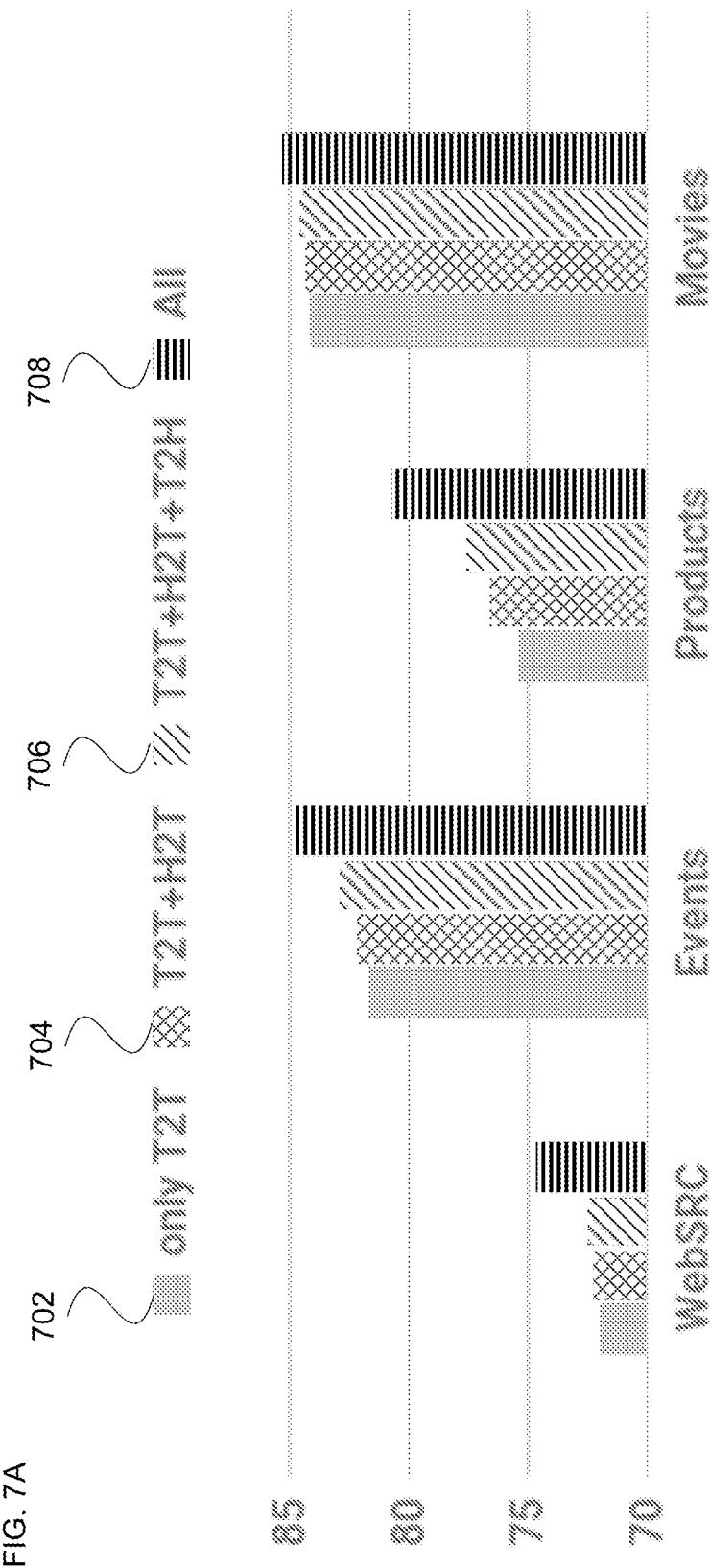
FIGS. 7A-B illustrates charts comparing aspects of the technology to other arrangements.
Figure 7B:
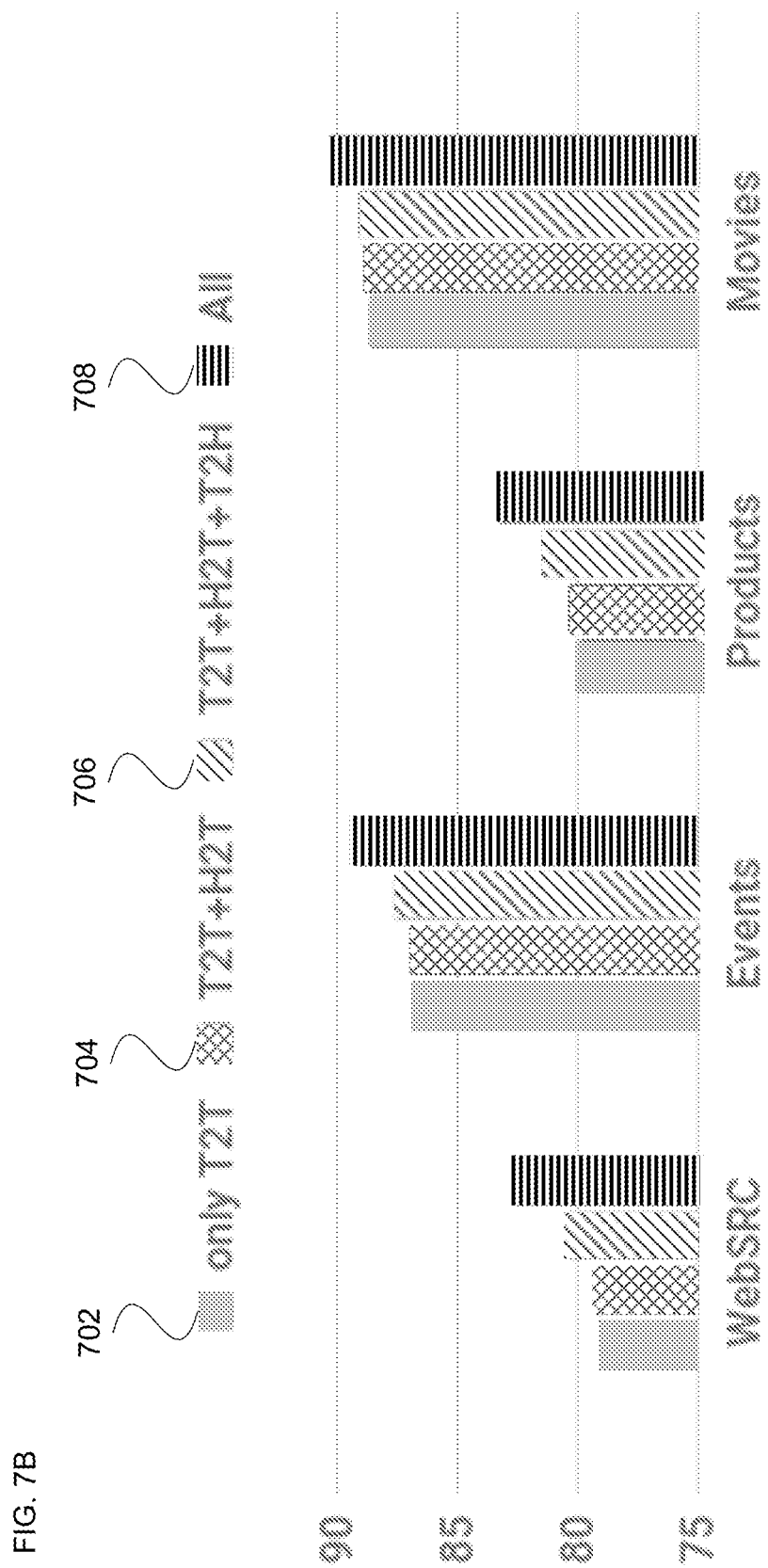

To evaluate the impact of the rich attention patterns, a set of experiments were conducted by removing one or more attention from the model. The model was first trained in this example by removing the H2H graph attention, and refer that modified model to T2T+H2T+T2H. Similarly, another two models were trained with T2T attention only and T2T+H2T attentions. The results of these three models and the WebFormer model (denoted as "All") on all datasets are shown in FIGS. 7A-B, where 702 is for only T2T, 704 is T2T+H2T, 706 is T2T+H2T+T2H, and 708 is the full Webformer model. It can be seen from these figures that the performance drops significantly without the H2H graph attention by comparing T2T+H2T+T2H with All. This observation validates that the HTML layout information encoded within the H2H attention is crucial for extracting structure fields from web documents. Moreover, it is clear that the T2H and H2T attentions further improve the model performance on all datasets.

Figure 8A:
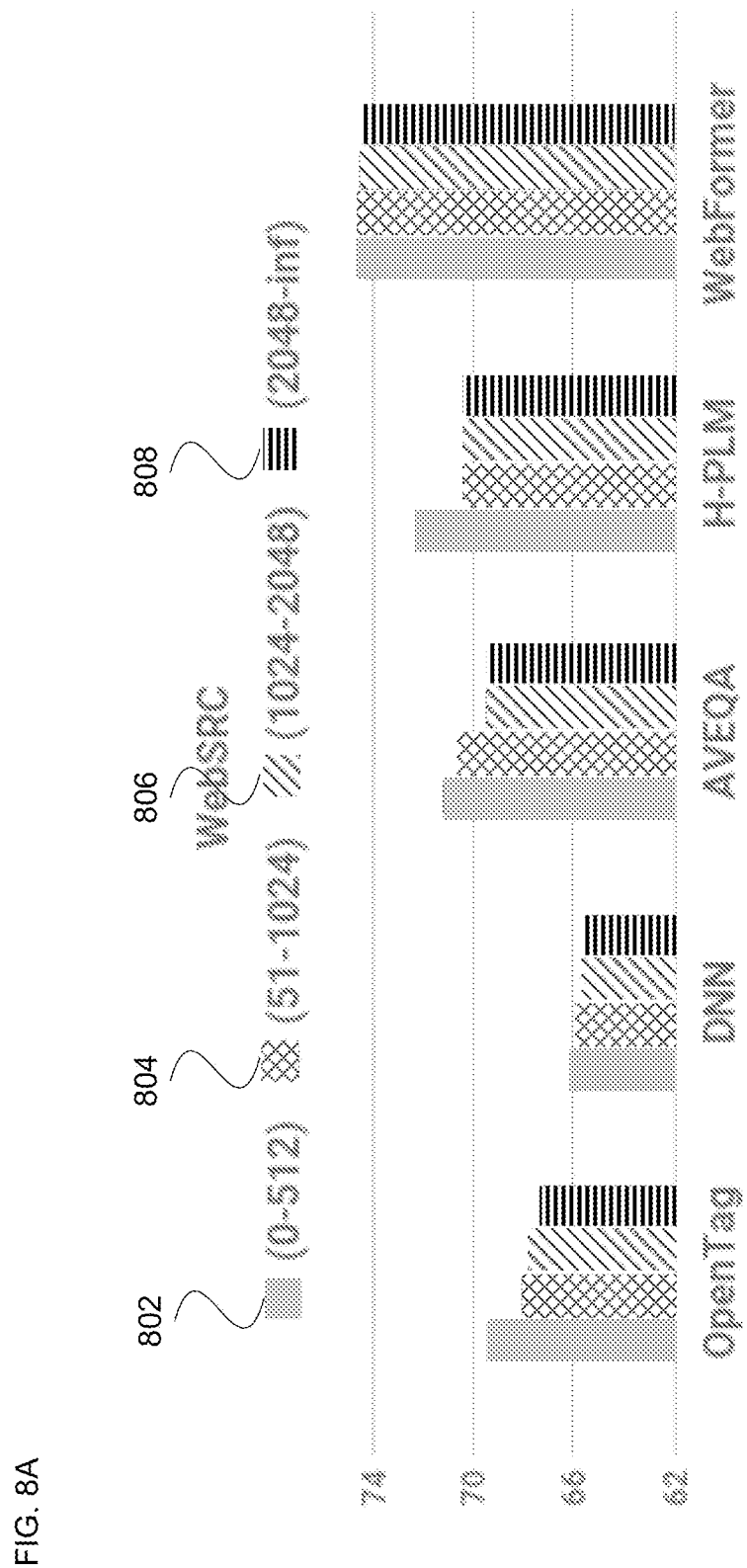
FIGS. 8A-B illustrates charts comparing aspects of the technology to other arrangements.
Figure 8B:
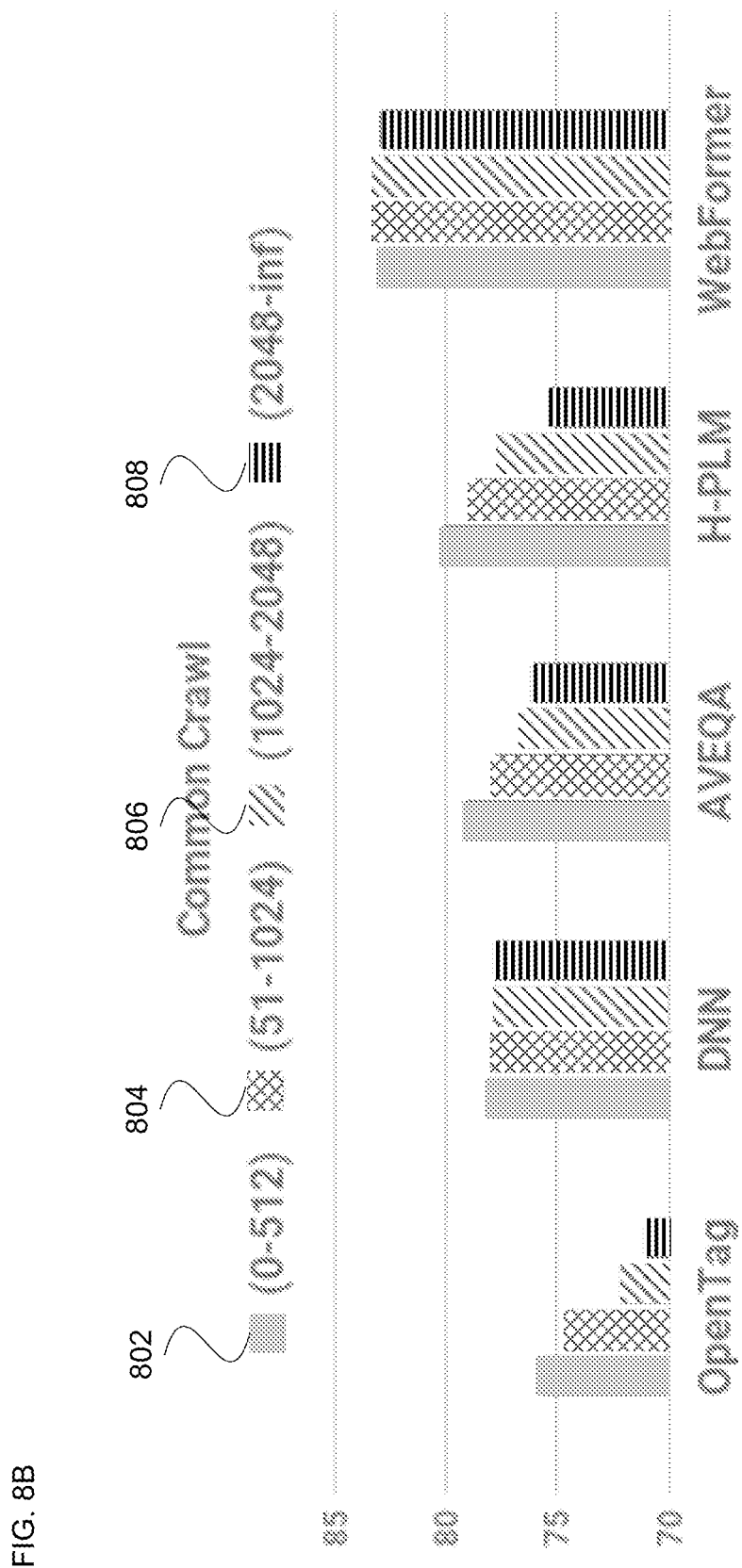

To understand the impact of different models on large documents with long text sequence, the test examples were grouped into four buckets with respect to the sequence length of the example (here, 0-512, 512-1024, 1024-2048 and 2048-infinite (or "inf")), and compute the metrics in each bucket for all methods. The EM scores on both datasets (for Common Crawl, we merge all the test sets from Events, Products and Movies) are shown in FIGS. 8A-B, in which 0-512 is block 802, 512-1024 is block 804, 1024-2048 is block 806 and 2048-infinite is block 808. FIG. 8A is for WebSRC and FIG. 8B is for Common Crawl. It can be seen that WebFormer model achieves consistent results with respect to the sequence length. In contrast, the performance of OpenTag, AVEQA and H-PLM goes down with the increasing of the sequence length. It is hypothesized that this is due to the fact that WebFormer utilizes L2L relative attention and the H2L attention, which enables the model to encode web documents with long sequences effectively and efficiently. Note that the DNN model does not depend on the sequence length and thus does not suffer from the long sequence.

A series of ablation studies of the WebFormer model were also conducted. In one scenario, the WebFormer base model contains 12 layers. The model was first evaluated with a different number of encoder layers, specifically 2L, 6L and 24L. Another ablation of the WebFormer model was conducted by sharing the model parameters. Specifically, the query matrices of the text and HTML tokens were shared, in which $W_Q^{T2T}=W_Q^{T2H}=W_Q^T$, $W_Q^{H2H}=W_Q^{H2T}=W_Q^H$, $W_K^{T2T}=W_K^{H2T}=W_K^T$, and $W_K^{H2H}=W_K^{T2H}=W_K^H$. This model embodiment is referred to as WebFormer-12L-share. The EM results with the number of model parameters are shown in Table 4 of FIG. 9. It can be observed that WebFormer-24L achieves the best performance. However, a larger model usually requires longer training time, as well as inference.

Figure 10:
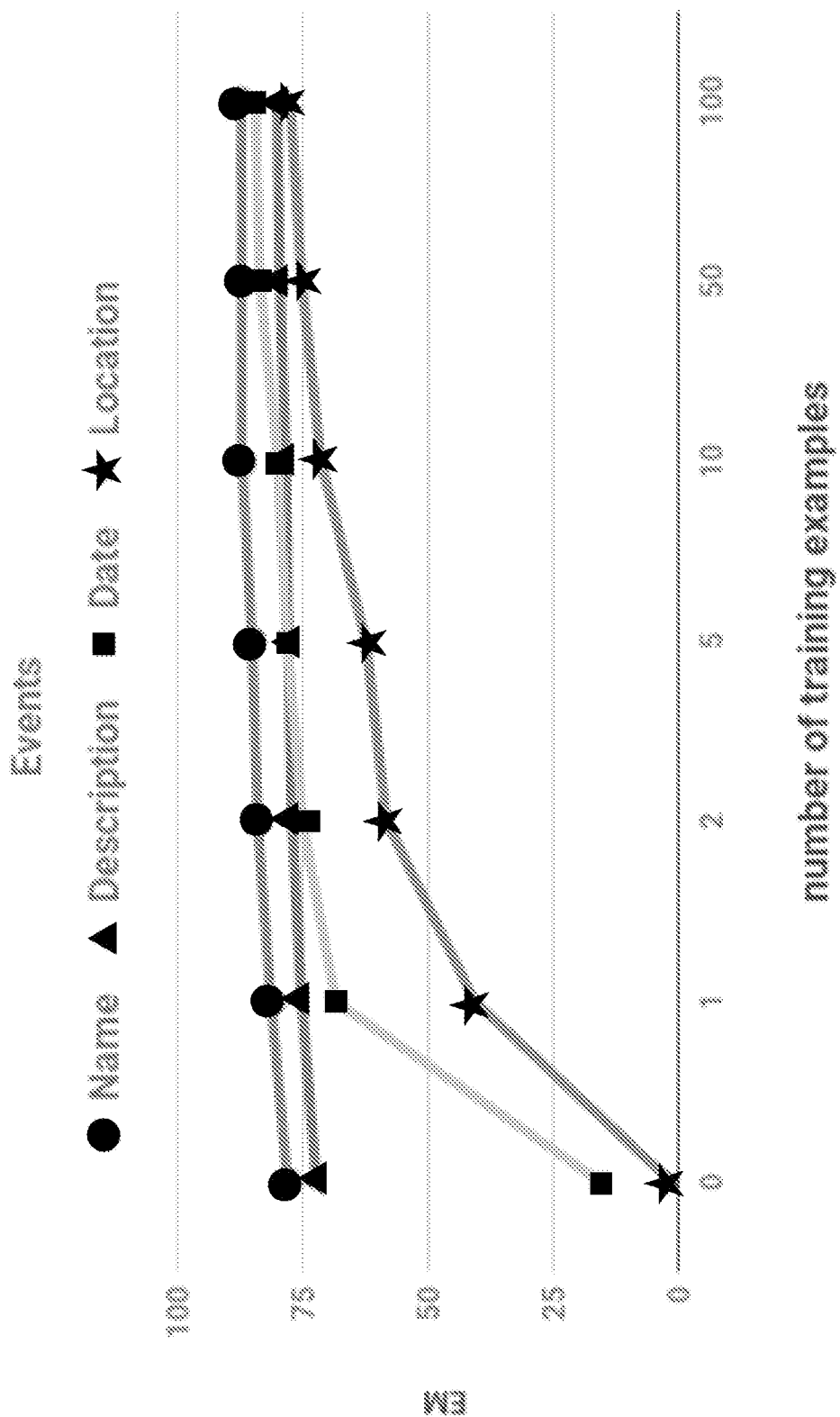
FIG. 10 presents a chart illustrating aspects of the technology.

To evaluate the generalization ability of the WebFormer model on unseen domains/fields, zero-shot and few-shot extraction experiments were conducted. In this experiment, a WebFormer model is first pretrained on Products and Movies data only. Finetuning is then performed on Events data for 10K steps by varying the number of training examples from {0, 1, 2, 5, 10, 50, 100}. The EM scores of the WebFormer model on all four event fields are shown in the chart of FIG. 10. There are several interesting observations from this chart. First, when the number of training examples is 0 (zero-shot extraction), the EM scores on "Name" and "Description" are reasonable around 75%. However, the score on "Location" is close to 0. The reason is that both "Name" and "Description" are general fields that appear across domains, e.g., they both present in Products and Movies data. Therefore, the learned knowledge in the WebFormer model can be directly transferred to a new domain (Events). On the other hand, the pretrained model lacks knowledge about "Location" and thus performs less well on this field. Second, it is not surprising to see that the EM scores increase with more training examples, and reach reasonably high values with 100 training examples. It is also observed that the EM score for "Location" boosts dramatically even with one or two training examples.

For the OpenTag, DNN, AVEQA and H-PLM baselines discussed above, the same English uncased WordPiece vocabulary was used as in BERT. The model parameters with the used features in DNN method are described in Table 5 of FIG. 11A. For all other sequence modeling approaches, their hyper-parameters details in presented in Table 6 of FIG. 11B. For the evaluation metrics, EM and F1, the following details are explained below. Exact Match (EM) was used to evaluate whether a predicted span is completely the same as the ground truth. F1 measured the overlap of the extracted answer and the ground truth by splitting the answer span into tokens and compute F1 score on them. Each experiment was repeated 10 times and the metrics on the test sets were reported based on the average over these runs.

To evaluate the model performance with different training batch size and learning rate, experiments were conducted to train a set of WebFormer models with a hyper-parameter sweep comprising learning rates in {3×10-5, 5×10-5, 1×10-4} and batch-size in {64, 128, 512} on the training set. The EM results with different learning rates and batch sizes on all datasets are reported in Table 7 of FIG. 12. It can be seen from the tables that during that testing WebFormer achieve the best result with batch size 64 and learning rate 3×10-5 on all datasets except Products.

An error analysis of the WebFormer model was conducted over 120 randomly selected Exact Match mistakes on Common Crawl dataset (10 per field). Several major mistake patterns were identified and are summarized here. First: substring extraction. During testing, it was found that the largest group of mistakes was that the model extracts a substring of the ground-truth text. For instance, a substring of the "name" field or a subset of the "description" may be extracted. Second: Multiple occurrences issue. Here, there were cases where the field is mentioned multiple times on the web page. For example, in the example of FIG. 2, the "date" appears in multiple places 212 on the webpage. Here, the model would have extracted "DEC 11" which is correct, but the ground-truth text is "Sat, Dec. 11, 2011". Similar issues may occur for "location". Third: Multi-object/value issue. Another type of error that can arise is that the field has multiple values and the model may only extract one of them. Fourth: Range issue. Here, there may be a certain amount of mistakes that fall into the range issue group. For instance, the model may extract a "price" as "19.90" from the ground-truth "19.90-26.35", which is actually a range of prices. Fifth: Model mistakes. There may be a few other extraction errors, such as confusion about what is the "brand" of a TV product, which can be a hard case even for human raters.

By looking closely at mistake patterns, it can be observed that the model actually extracts the correct or partially correct answers for most cases involving substring extraction, multiple occurrences, multi-object/value, and range issues. Should such mistakes occur, they can be easily fixed by marking all answer occurrences and values as positives in the training, and adopting a BIO-based span extraction.

Figure 13:
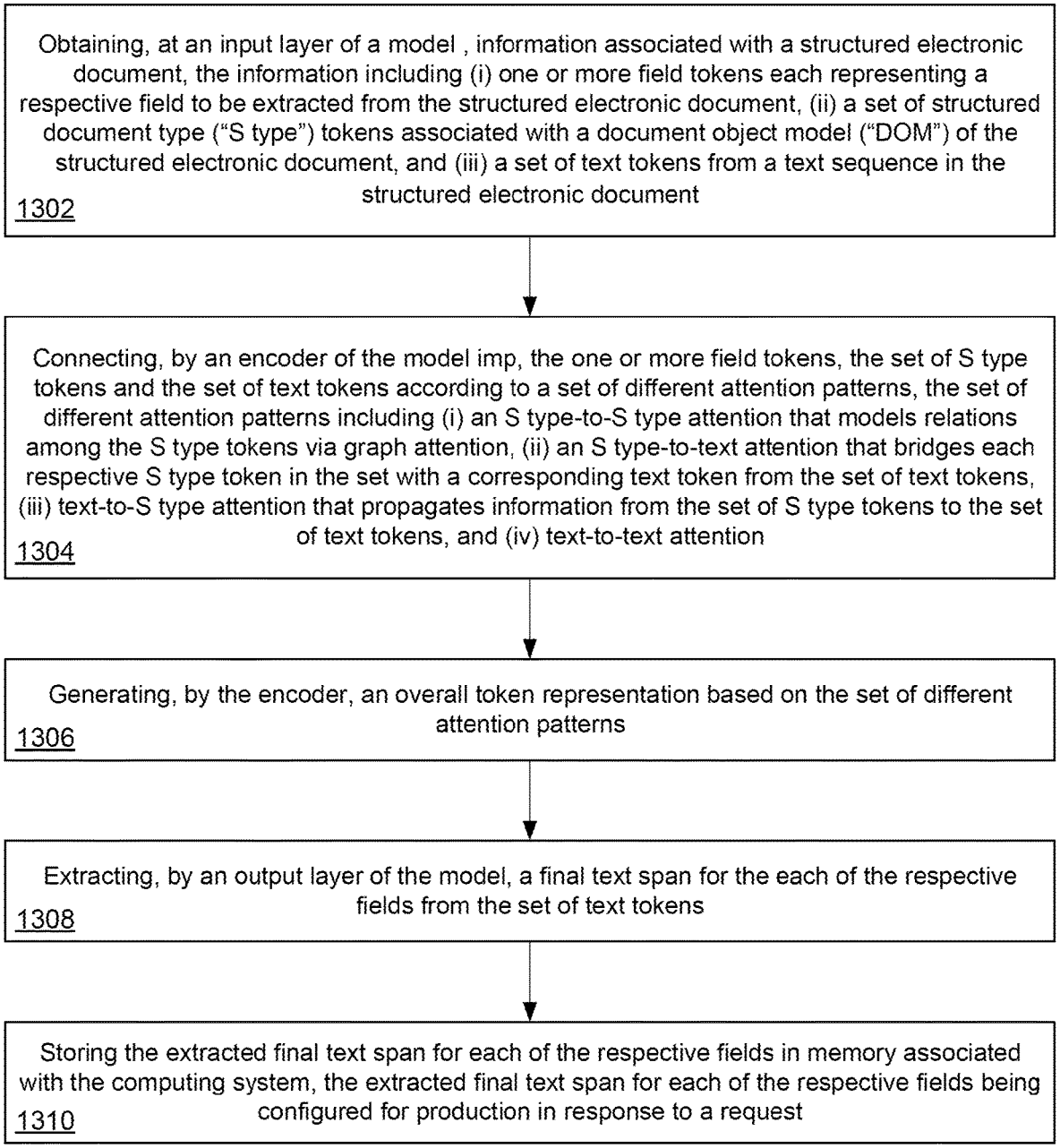
FIG. 13 is a flow diagram of an exemplary method in accordance with aspects of the disclosure.

FIG. 13 illustrates a flow diagram for structured information extraction from electronic documents. At block 1302 the method includes obtaining, at an input layer of a model implemented by one or more processors of a computing system, information associated with a structured electronic document. The information includes (i) one or more field tokens each representing a respective field to be extracted from the structured electronic document, (ii) a set of structured document type ("S type") tokens associated with a document object model ("DOM") of the structured electronic document, and (iii) a set of text tokens from a text sequence in the structured electronic document. At block 1304, the method includes connecting, by an encoder of the model implemented by the one or more processors of the computing system, the one or more field tokens, the set of S type tokens and the set of text tokens according to a set of different attention patterns. As described herein, the set of different attention patterns includes (i) an S type-to-S type attention that models relations among the S type tokens via graph attention, (ii) an S type-to-text attention that bridges each respective S type token in the set with a corresponding text token from the set of text tokens, (iii) text-to-S type attention that propagates information from the set of S type tokens to the set of text tokens, and (iv) text-to-text attention. At block 1306 the method includes generating, by the encoder, an overall token representation based on the set of different attention patterns. At block 1308 the method includes extracting, by an output layer of the model, a final text span for the each of the respective fields from the set of text tokens. And at block 1310 the method includes storing the extracted final text span for each of the respective fields in memory associated with the computing system. Thus, the extracted final text span for each of the respective fields is configured for production in response to a request.

In summary, the above provide a new Web-page transformer model, namely "WebFormer", for structure information extraction from web documents. The structured layout information (HTML or other structured data) is jointly encoded through the rich attention patterns with the text information. WebFormer effectively recovers both local syntactic and global layout information from web document serialization. An extensive set of experimental results on WebSRC and Common Crawl benchmarks demonstrates the superior performance of the proposed approach over other techniques. Such a model may be employed in multimodal learning that incorporates visual features as well as textual features. And while HTML was illustrated as an example above, the model architecture encompasses other structured documents in a fully structured or semi-structured format. This includes other markup languages that use tags to define elements with a document (e.g., XML, XHTML or SGML).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A method for structured information extraction from electronic documents, the method comprising:
    obtaining, at an input layer of a model implemented by one or more processors of a computing system, information associated with a structured electronic document, the information including (i) one or more field tokens each representing a respective field to be extracted from the structured electronic document, (ii) a set of structured document type ("S type") tokens associated with a document object model ("DOM") of the structured electronic document, and (iii) a set of text tokens from a text sequence in the structured electronic document;
    connecting, by an encoder of the model implemented by the one or more processors of the computing system, the one or more field tokens, the set of S type tokens and the set of text tokens according to a set of different attention patterns, the set of different attention patterns including (i) an S type-to-S type attention that models relations among the S type tokens via graph attention, (ii) an S type-to-text attention that bridges each respective S type token in the set with a corresponding text token from the set of text tokens, (iii) text-to-S type attention that propagates information from the set of S type tokens to the set of text tokens, and (iv) text-to-text attention;
    generating, by the encoder, an overall token representation based on the set of different attention patterns;
    extracting, by an output layer of the model implemented by the one or more processors of the computing system, a final text span for the each of the respective fields from the set of text tokens; and
    storing the extracted final text span for each of the respective fields in memory associated with the computing system, the extracted final text span for each of the respective fields being configured for production in response to a request.

2. The method of claim 1, wherein the structured electronic document has a Hypertext Markup Language ("HTML") layout, and the set of S type tokens is a set of HTML tokens.

3. The method of claim 2, wherein the S type-to-S type attention is HTML-to-HTML attention in which the set of HTML tokens are connected via a DOM tree graph.

4. The method of claim 1, wherein the extracted final text span for each of the respective fields is stored in memory as a contextual representation of the structured electronic document.

5. The method of claim 1, wherein the overall token representation includes output embeddings for the one or more field tokens, the set of S type tokens, and the set of text tokens.

6. The method of claim 5, wherein the final text span for each of the respective fields is computed based on an encoded field-dependent text embedding for that respective field.

7. The method of claim 1, further comprising converting, at the input layer, each token of the one or more field tokens, the set of S type tokens, and the set of text tokens into a corresponding d-dimensional embedding vector.

8. The method of claim 7, in which the S type tokens are formulated by concatenating a tag embedding and a segment embedding, in which the segment embedding indicates which type a given token belongs.

9. The method of claim 7, wherein embeddings according to the converting are trainable based on one or more hyperparameters selected during training of the model.

10. The method of claim 9, wherein the one or more hyperparameters include at least one of batch size, training epoch, optimizer type, learning rate schedule, initial learning rate, learning rate warmup step amount or vocabulary size.

11. The method of claim 1, wherein the encoder comprises a set of contextual layers that connect the one or more field tokens, the set of S type tokens, and the set of text tokens with the set of different attention patterns, followed by a feed-forward network.

12. The method of claim 11, wherein the set of contextual layers is identical.

13. The method of claim 1, wherein:
the structured electronic document comprises a plurality of fields and the one or more field tokens is a set of field tokens having each token correspond to one of the plurality of fields; and
field information for each field token is jointly encoded so that the plurality of fields shares a unique encoder.

14. A processing system configured for structured information extraction from electronic documents, the processing system comprising:
memory configured to store data associated with the structured information extraction; and
one or more processors operatively coupled to the memory, the one or more processors being configured to:
obtain, at an input layer of a model, information associated with a structured electronic document, the information including (i) one or more field tokens each representing a respective field to be extracted from the structured electronic document, (ii) a set of structured document type ("S type") tokens associated with a document object model ("DOM") of the structured electronic document, and (iii) a set of text tokens from a text sequence in the structured electronic document;
connect, by an encoder of the model, the one or more field tokens, the set of S type tokens and the set of text tokens according to a set of different attention patterns, the set of different attention patterns including (i) an S type-to-S type attention that models relations among the S type tokens via graph attention, (ii) an S type-to-text attention that bridges each respective S type token in the set with a corresponding text token from the set of text tokens, (iii) text-to-S type attention that propagates information from the set of S type tokens to the set of text tokens, and (iv) text-to-text attention;
generate, by the encoder, an overall token representation based on the set of different attention patterns;
extract, by an output layer of the model, a final text span for the each of the respective fields from the set of text tokens; and
store, in the memory, the extracted final text span for each of the respective fields in memory associated with the computing system, the extracted final text span for each of the respective fields being configured for production in response to a request.

15. The processing system of claim 14, wherein the extracted final text span for each of the respective fields is stored in the memory as a contextual representation of the structured electronic document.

16. The processing system of claim 14, wherein the one or more processors are further configured to convert, at the input layer, each token of the one or more field tokens, the set of S type tokens, and the set of text tokens into a corresponding d-dimensional embedding vector.

17. The processing system of claim 16, in which the S type tokens are formulated by concatenation of a tag embedding and a segment embedding, in which the segment embedding indicates which type a given token belongs.

18. The processing system of claim 16, wherein embeddings according to the conversion are trainable based on one or more hyperparameters selected during training of the model.

19. The processing system of claim 18, wherein the one or more hyperparameters include at least one of batch size, training epoch, optimizer type, learning rate schedule, initial learning rate, learning rate warmup step amount or vocabulary size.

20. The processing system of claim 14, wherein the encoder is implemented as a set of contextual layers that connect the one or more field tokens, the set of S type tokens, and the set of text tokens with the set of different attention patterns, followed by a feed-forward network.

* * * * *

UNITED STATES PATENT AND TRADEMARK OFFICE
CERTIFICATE OF CORRECTION

PATENT NO. : 12,222,995 B2
APPLICATION NO. : 18/200813
DATED : February 11, 2025
INVENTOR(S) : Qifan Wang and Dongfang Liu Page 1 of 1

It is certified that error appears in the above-identified patent and that said Letters Patent is hereby corrected as shown below:

In the Claims

Column 18, Line 8, Claim 14:
Now reads: "computing system"; should read -- processing system --

Signed and Sealed this
Twenty-fifth Day of March, 2025

Coke Morgan Stewart
*Acting Director of the United States Patent and Trademark Office*